(12) United States Patent
Arimoto et al.

(10) Patent No.: US 7,648,724 B2
(45) Date of Patent: Jan. 19, 2010

(54) INTERMOLECULAR COMPOUNDS OF FATTY ACID TRIGLYCERIDES

(75) Inventors: Shin Arimoto, Yokosuka (JP); Hidetaka Uehara, Yokosuka (JP); Satoshi Negishi, Yokosuka (JP)

(73) Assignee: The Nisshin OilliO Group, Ltd., Chuo-Ku, Tokyo (JP)

( * ) Notice: Subject to any disclaimer, the term of this patent is extended or adjusted under 35 U.S.C. 154(b) by 282 days.

(21) Appl. No.: 11/938,399

(22) Filed: Nov. 12, 2007

(65) Prior Publication Data

US 2008/0260931 A1    Oct. 23, 2008

Related U.S. Application Data

(63) Continuation of application No. PCT/JP2006/309645, filed on May 15, 2006.

(30) Foreign Application Priority Data

May 13, 2005    (JP)    ............................. 2005-141551

(51) Int. Cl.
*A23D 7/00* (2006.01)
(52) U.S. Cl. ........................................ 426/607; 426/601
(58) Field of Classification Search ................. 426/531, 426/601, 603, 606, 607, 660; 554/206, 227
See application file for complete search history.

(56) References Cited

U.S. PATENT DOCUMENTS

| | | | | |
|---|---|---|---|---|
| 4,364,868 A | * | 12/1982 | Hargreaves | ................. 554/169 |
| 5,288,512 A | * | 2/1994 | Seiden | ........................ 426/607 |
| 5,599,574 A | * | 2/1997 | Guskey et al. | ............. 426/660 |
| 6,258,398 B1 | * | 7/2001 | Okada et al. | ................. 426/607 |

FOREIGN PATENT DOCUMENTS

JP    4-075593 A    3/1992

(Continued)

OTHER PUBLICATIONS

Tetsuo Koyano et al., "Physical Properties of Equally Mixed Systems of 1,3-Dioleoyl-2-Stearoylglycerol/Cocoa Butter and 1,3-Dioleoyl-2-Stearoylglycerol-Added Dark Chocolate", Journal Japan Oil Chemists' Society, vol. 42, No. 3, pp. 184-189, 1993 (with English language summary, cited on p. 3 of the specification).

(Continued)

*Primary Examiner*—Keith D Hendricks
*Assistant Examiner*—Patricia A George
(74) *Attorney, Agent, or Firm*—Buchanan Ingersoll & Rooney PC

(57) ABSTRACT

There are provided an intermolecular compound of (a) di-saturated medium chain fatty acids mono-saturated long chain fatty acid triglyceride and (b) 1,3-di-saturated long chain fatty acids 2-mono-unsaturated long chain fatty acid triglyceride, of which a long spacing value by X-ray diffraction is 65 Å or more, and foods containing the intermolecular compound. The intermolecular compound can be used as a part of fats and oils that constitute foods. Due to formation of the intermolecular compound, the fats and oils containing large amounts of symmetric triglycerides such as cocoa butter and those containing medium chain fatty acids do not form separate crystals and, therefore, can keep smooth texture and prevent blooming.

11 Claims, 5 Drawing Sheets

FOREIGN PATENT DOCUMENTS

| | | |
|---|---|---|
| JP | 4-135453 A | 5/1992 |
| JP | 5-311190 A | 11/1993 |
| JP | 8-269478 A | 10/1996 |
| JP | 3146589 B2 | 3/2001 |
| JP | 2002-065162 A | 3/2002 |
| JP | 2002-069484 A | 3/2002 |
| JP | 2002-121584 A | 4/2002 |
| JP | 2003-169600 A | 6/2003 |
| JP | 2003-169601 A | 6/2003 |
| JP | 2003-210107 A | 7/2003 |
| JP | 2003-213287 A | 7/2003 |
| JP | 2003-213289 A | 7/2003 |
| JP | 2003-213291 A | 7/2003 |
| JP | 2003-284491 A | 10/2003 |
| JP | 2003-304807 A | 10/2003 |
| JP | 3464646 B2 | 11/2003 |
| JP | 2004-089006 A | 3/2004 |
| JP | 2004-285193 A | 10/2004 |
| JP | 2004-305048 A | 11/2004 |
| WO | WO 2005/005586 A1 | 1/2005 |

OTHER PUBLICATIONS

Satoru Ueno et al., "Time-Resolved Synchrotron Radiation X-Ray Diffraction Study of Polymorphic Crystallization of a Single System and Binary Mixtures Systems in Triacylglycerols", Journal of the Japanese Society for Synchrotron Radiation Research, vol. 11, No. 3, Jun. 1998, pp. 208-217 (with English language summary, cited on p. 3 of the specification).

Tetsuo Koyano et al., "Physical Properties of Equally Mixed Systems of 1,3-Dioleoyl-2-Stearoylglycerol/Cocoa Butter and 1,3-Dioleoyl-2-Stearoylglycerol-Added Dark Chocolate", Journal of the Japan Oil Chemists' Society, vol. 42, No. 3, pp. 184-189, 1993 (with English language summary, cited on p. 3 of the specification).

Form PCT/ISA/210 (International Search Report) dated Jul. 25, 2006.

Form PCT/ISA/237 (Written Opinion of the International Searching Authority) dated Jul. 12, 2006.

Paul J. M. W. L.. Birker et al., "Structural Investigations of β' Triacylglycerols: An X-Ray Diffraction and Microscopic Study of Twinned β' Crystals", JAOCS (Journal of the American Oil Chemists' Society), Dec. 1991, vol. 68, No. 12, pp. 895-906, published by the American Oil Chemists' Society (cited in the attached Form PCT/ISA/210 and Form PCT/ISA/237).

\* cited by examiner

INTERMOLECULAR COMPOUNDS OF FATTY ACID TRIGLYCERIDES

BACKGROUND OF THE INVENTION

The present invention relates to intermolecular compounds of at least two kinds of fatty acid triglycerides having different molecular structures and foods containing the same. Intermolecular compounds are also called as compound crystals.

BACKGROUND OF THE INVENTION

Conventionally, by utilizing the feature that two kinds of fatty acid triglycerides having different molecular structures form intermolecular compounds and the feature of thus formed intermolecular compounds, the procedures have been often taken that such triglycerides are used by being contained in foods such as chocolates, margarine, and shortening (Non-Patent Literatures 1 and 2, Patent Literatures 1 to 15). However, all of these procedures were regarding the intermolecular compounds that are formed by combination of St-U-St type triglyceride (St: saturated fatty acids, U: unsaturated fatty acids) and U-St-U type triglyceride.

On the other hand, it has been known that combination of St-U-St type triglyceride (St: saturated fatty acids, U: unsaturated fatty acids) and St-St-St type triglyceride such as POP type triglyceride (1,3-dipalmitoyl-2-oleoylglycerin) and PPP type triglyceride (tripalmitin) (Non-Patent Literature 2); and cocoa butter and cocoa butter substitute (CBS, hardened lauric fat and fatty oil) can neither form intermolecular compounds nor have compatibility and, therefore, each triglyceride independently crystallizes to form eutectic crystals.

Namely, until now, combination of St-U-St type triglyceride (St: saturated fatty acids, U: unsaturated fatty acids) and St-St-St type triglyceride has not been able to form intermolecular compounds and, therefore, foods have not been able to be obtained such as those containing the intermolecular compounds of these two kinds of fatty acid triglycerides having different molecular structures and utilizing the feature thereof.

Further, recent years, it has been frequently practiced that a kind(s) of fatty acids constituting triglyceride or the binding position thereof is changed in order to reform the property of fats and oils, that is, triglycerides. For example, it has been disclosed in Patent Literature 16 that 1,3-di(S)-2-mono(X) type triglyceride (SXS) wherein a saturated fatty acid(s) (X) having 12 or less carbon atoms is bound to the second position and a saturated fatty acid(s) (S) having 16 or more carbon atoms is bound to the first and third positions is used as an agent for preventing fat blooming and such triglyceride is produced by conducting the ester exchange reaction using 1,3-specific lipase. Besides, Patent Literature 17 discloses that triglycerides wherein one of the constituent fatty acids is a saturated fatty acid having 12 or less carbon atoms and the rest two fatty acids are saturated fatty acids having 16 or more carbon atoms are produced by ester exchange of natural fats and oils; and they are used as graining inhibitors of cocoa butter, palm oil, and the like.

In addition to it, Patent Literature 18 discloses that triglyceride compositions containing: 1,3-di(S)-2-mono(X) type triglyceride (SXS) wherein a caprylic acid (X) is bound to the second position and palmitic acids or stearic acids (S) are bound to the first and third positions; and 1-mono(X) di(S) type triglyceride (SSX) wherein a caprylic acid (X) is bound to the first or third position and palmitic acids or stearic acids (S) are bound to the second and third positions or the first and second positions are used as agents for preventing fat blooming and they are dispensed to chocolates.

Further, Patent Literature 19 discloses the method for producing symmetric triglycerides of which first and third positions are medium chain fatty acids and the sn-second position is a long chain fatty acid, and availability of thus produced symmetric triglycerides of which sn-first and -third positions are octanoic acids and the sn-second position is a stearic acid as butter substitutes for chocolates.

However, even the above disclosures failed to form intermolecular compounds and utilize the features thereof.

| | |
|---|---|
| [Non-Patent Literature 1] | Journal of Oleo Science, Vol. 42, No. 3, P184 (1993) |
| [Non-Patent Literature 2] | Journal of the Japanese Society for Synchrotron Radiation Research (hosyako), Vol. 11, No. 3, P208 (1998) |
| [Patent Literature 1] | Japanese Patent No. 3464646 |
| [Patent Literature 2] | Japanese Patent Unexamined Publication No. 2002-69484 |
| [Patent Literature 3] | Japanese Patent Unexamined Publication No. 2003-213291 |
| [Patent Literature 4] | Japanese Patent Unexamined Publication No. 2002-121584 |
| [Patent Literature 5] | Japanese Patent Unexamined Publication No. 2004-285193 |
| [Patent Literature 6] | Japanese Patent Unexamined Publication No. 2003-304807 |
| [Patent Literature 7] | Japanese Patent Unexamined Publication No. 2003-213289 |
| [Patent Literature 8] | Japanese Patent Unexamined Publication No. 2004-89006 |
| [Patent Literature 9] | Japanese Patent Unexamined Publication No. 2004-305048 |
| [Patent Literature 10] | Japanese Patent Unexamined Publication No. 2003-213287 |
| [Patent Literature 11] | Japanese Patent Unexamined Publication No. 2003-210107 |
| [Patent Literature 12] | Japanese Patent Unexamined Publication No. 2003-169601 |
| [Patent Literature 13] | Japanese Patent Unexamined Publication No. 2003-169600 |
| [Patent Literature 14] | Japanese Patent Unexamined Publication No. 2003-284491 |
| [Patent Literature 15] | Japanese Patent Unexamined Publication No. Hei 4-135453 |
| [Patent Literature 16] | Japanese Patent Unexamined Publication No. Hei 4-75593 |
| [Patent Literature 17] | Japanese Patent Unexamined Publication No. Hei 5-311190 |
| [Patent Literature 18] | Japanese Patent No. 3146589 |
| [Patent Literature 19] | WO2005/5586 |

DISCLOSURE OF THE INVENTION

The object of the present invention is to provide intermolecular compounds of fatty acid triglycerides.

The further object of the present invention is to provide foods containing the intermolecular compounds.

The present invention has been completed on the basis of the finding that intermolecular compounds having unknown long spacing values by X-ray diffraction are formed by melt mixing two kinds of fatty acid triglycerides having the specific structures.

Namely, the present invention provides an intermolecular compound of (a) di-saturated medium chain fatty acids mono-saturated long chain fatty acid triglyceride and (b) 1,3-di-saturated long chain fatty acids 2-mono-unsaturated long chain fatty acid triglyceride, of which a long spacing values by X-ray diffraction is 65 Å or more.

The present invention also provides foods containing the intermolecular compounds.

BEST MODE FOR CARRYING OUT THE INVENTION

Figure 1:
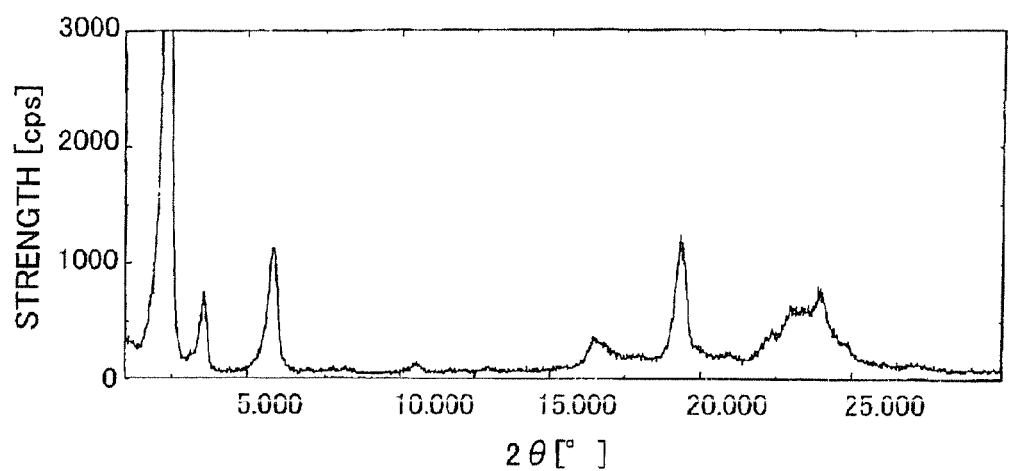
FIG. 1 shows the X-ray diffraction chart of the intermolecular compound I-T of the present invention.
Figure 2:
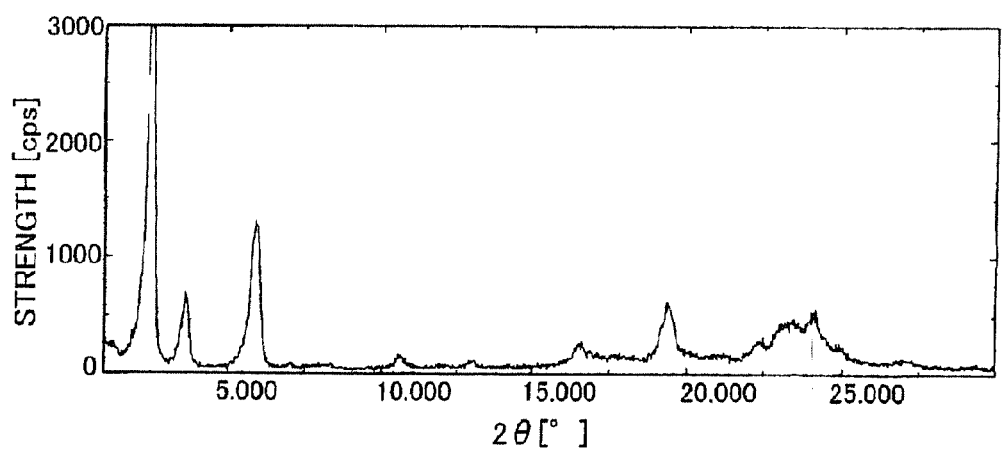
FIG. 2 shows the X-ray diffraction chart of the intermolecular compound I-N of the present invention.
Figure 3:
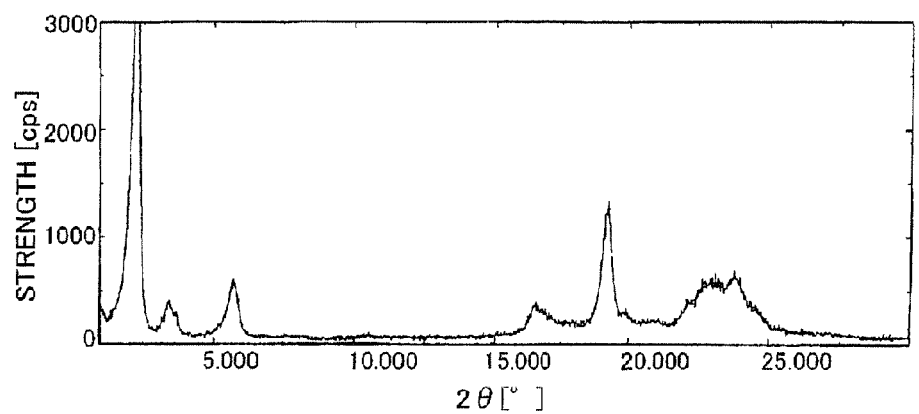
FIG. 3 shows the X-ray diffraction chart of the intermolecular compound I-S of the present invention.
Figure 4:
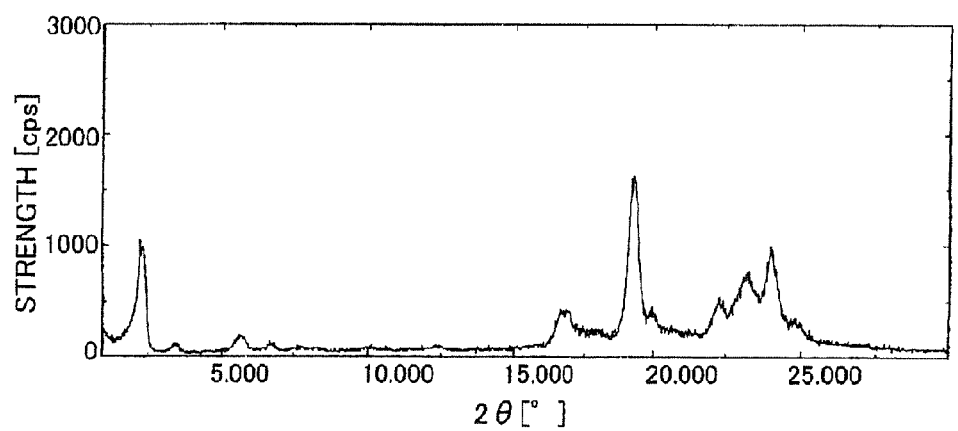
FIG. 4 shows the X-ray diffraction chart of the intermolecular compound II of the present invention.
Figure 5:
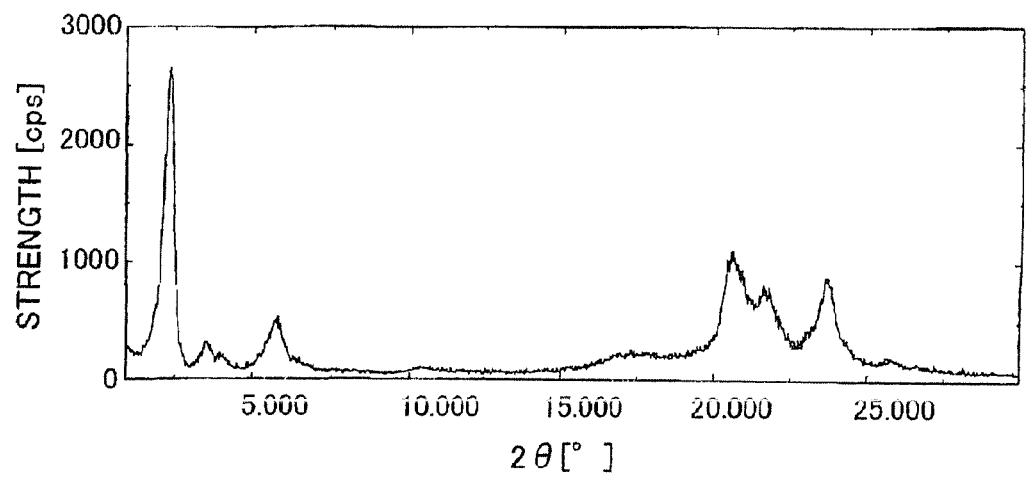
FIG. 5 shows the X-ray diffraction chart of the intermolecular compound III of the present invention.
Figure 6:
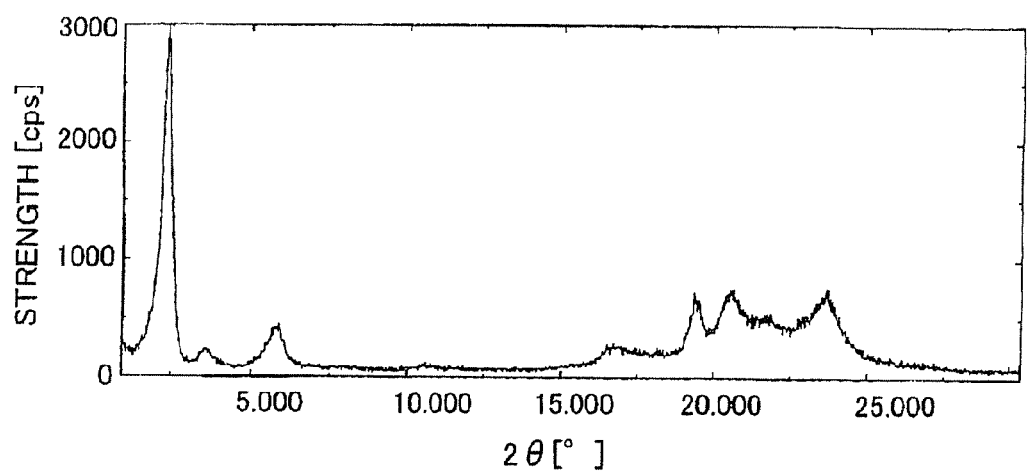
FIG. 6 shows the X-ray diffraction chart of the intermolecular compound IV of the present invention.

Di-saturated medium chain fatty acids mono-saturated long chain fatty acid triglycerides used as the component (a) of the present invention preferably have medium chain fatty acids having 6 to 12 carbon atoms, more preferably 6 to 10 carbon atoms and further more preferably 8 to 10 carbon atoms. Particularly, octanoic acid and decanoic acid are preferable among them. Besides, long chain fatty acids thereof are preferably those having 14 to 24 carbon atoms and more preferably 16 to 22 carbon atoms. Particularly, long chain fatty acids having 16 to 18 carbon atoms are preferable and they include palmitic acid and stearic acid. These fatty acids may have a linear chain or a branched chain, and those having a linear chain are preferable.

Di-saturated medium chain fatty acids mono-saturated long chain fatty acid triglycerides used as the component (a) of the present invention are preferably 1,3-di-saturated medium chain fatty acids 2-mono-saturated long chain fatty acid triglycerides.

Two medium chain fatty acids constituting di-saturated medium chain fatty acids mono-saturated long chain fatty acid triglycerides of the component (a) may be the same or different from one another, but they are preferably the same with each other.

Di-saturated medium chain fatty acids mono-saturated long chain fatty acid triglycerides used as the component (a) of the present invention are preferably 8S8 triglycerides of which the first and third positions are octanoic acid and the second position is stearic acid; 88S triglycerides of which the first and second positions are octanoic acid and the third position is stearic acid; and S88 triglycerides of which the first position is stearic acid and the second and third positions are octanoic acid.

The di-saturated medium chain fatty acids mono-saturated long chain fatty acid triglycerides of the component (a) can be easily prepared, for example, by ester exchange of natural fats and oils, particularly by ester exchange with lipases. Among them, symmetric triglycerides of which the first and third positions are medium chain fatty acids and the sn-second position is a long chain fatty acid are preferably produced by the method described in WO2005/5586. More concretely, the method is preferably comprising the steps of: randomly exchanging esters of medium chain fatty acid triglycerides and long chain fatty acid triglycerides with enzymes or chemical catalysts in the first reaction to obtain a reaction substance containing triglycerides having medium chain fatty acids and long chain fatty acids as constituent fatty acids; exchanging esters of the reaction substance and alcohol monoester of the medium chain fatty acids with sn-1st, 3rd position specific enzymes in the second reaction; and removing (a part or all of) the alcohol monoesters of the medium chain fatty acids and long chain fatty acids from the reaction substance obtained by the second reaction to obtain symmetric triglycerides of which the first and third positions are medium chain fatty acids and the sn-second position is a long chain fatty acid.

1,3-Di-saturated long chain fatty acids 2-mono-unsaturated long chain fatty acid triglycerides used as the component (b) of the present invention preferably have long chain fatty acids having 14 to 24 carbon atoms and more preferably 16 to 22 carbon atoms. Particularly, long chain fatty acids having 16 to 18 carbon atoms are preferable and they include palmitic acid and stearic acid. The unsaturated fatty acids constituting the component (b) include those having one or more double bonds in molecules, and those having one double bond in molecules are preferable. An oleic acid, linoleic acid and linolenic acid are preferable among them and oleic acid is particularly preferable. These fatty acids may have a linear chain or a branched chain, and those having a linear chain are preferable.

1,3-Di-saturated long chain fatty acids 2-mono-unsaturated long chain fatty acid triglycerides used as the component (b) of the present invention are preferably POP triglycerides of which the first and third positions are palmitic acid and the second position is oleic acid (1,3-dipalmitoyl-2-oleoyl glycerin); POS triglycerides of which the first and third positions are palmitic acid and stearic acid and the second position is oleic acid (2-oleoyl palmitoyl stearoyl glycerin); and SOS triglycerides of which the first and third positions are stearic acid and the second position is oleic acid (1,3-distearoyl-2-oleoyl glycerin).

As 1,3-di-saturated long chain fatty acids 2-mono-unsaturated long chain fatty acid triglycerides used as the component (b) of the present invention, naturally existing ones, that is, cocoa butter, sal butter, shea butter, illipe butter, mango kernel oil, Kokumu butter, cottonseed stearin, palm oil or fractionated oils thereof can be used, for example. The symmetric triglycerides may be prepared by lipases (please refer to Japanese Patent Unexamined Publication No. Sho 5571797 or Japanese Patent Unexamined Publication No. Sho 62-155048 as examples).

Especially, fats and oils containing large amounts of symmetric triglycerides such as POP, POS and SOS are preferable, and cocoa butter, sal stearin, shea strearin, illipe butter, mango kernel oil, Kokumu butter, and palm midfraction (PMF) are preferable. In case of using these fats and oils, a total content of POP type triglyceride (1,3-dipalmitoyl-2-oleoyl glycerin), POS type triglyceride (2-oleoyl palmitoyl stearoyl glycerin) and SOS type triglyceride (1,3-distearoyl-2-oleoyl glycerin) is preferably 70 weight % or more, and particularly preferably 80 weight % or more.

The intermolecular compounds of the present invention can be formed by melt mixing triglycerides of the components (a) and (b) by heating them up to 50 to 60° C. When mixing the triglycerides of the components (a) and (b), an organic solvent(s) may be used. In such a case, the component (a)/the component (b) is preferably 5/95 to 95/5 by weight ratio, more preferably 20/80 to 80/20 by weight ratio, and further more preferably 30/70 to 70/30 by weight ratio. On the other hand, the molar ratio of the component (a)/the component (b) is preferably about 1/1.

Preferable organic solvents include ketones such as acetone and methylethyl ketone; hydrocarbons such as hexane and petroleum ether; aromatic hydrocarbons such as benzene and toluene; alcohols such as methanol, ethanol and propanol; hydroalcohols; and ethers such as diethyl ether; esters such as ethyl acetate. Any organic solvents are acceptable if they dissolve triglycerides at boiling point or lower and melting point thereof is lower than cooling temperature. Acetone, hexane, alcohols and hydroalcohols are preferable and acetone is most preferable.

The long spacing value of the intermolecular compounds of the present invention can be calculated from value d (Å, the surface spacing of crystal faces) of the peak corresponding to surfaces having Miller indexes (001) that are observed at around $2\theta=0$ to $10°$ by X-ray diffractometer (X-ray wavelength: $\lambda=1.5405$ Å). The intermolecular compounds of the present invention preferably have the long spacing value of 70 Å or more, more preferably 70 to 85 Å and most preferably 74 to 82 Å. For comparison, in 100% cocoa butter, the peak to the (002) reflections of the long spacing value of 64 Å is observed at around $2\theta=2.8°$, that to the surface (004) thereof is observed at around $2\theta=5.5°$.

The intermolecular compounds of the present invention can be used as fat and fatty oil components contained in foods. For example, they can be used as fat and fatty oil components contained in chocolates, margarine, shortening, and the like. The concrete uses of margarine or shortening include those for kneading, rolling-in, cream, sandwich filling, spray coating, and frying, and are not particularly limited. Meanwhile, "chocolates" described in the present specification are not limited to those specified by contracts and legislations, but include all chocolates and fat and fatty oil processed foods.

According to the present invention, it can provide intermolecular compounds of fats and oils that have not been known until now. These intermolecular compounds can be used as a part of fats and oils that constitute foods. Due to formation of the intermolecular compounds, the fats and oils containing large amounts of symmetric triglycerides such as cocoa butter and those containing medium chain fatty acids do not form separate crystals and, therefore, can keep smooth texture and prevent blooming.

These intermolecular compounds can be used as fats and oils that constitute margarine or shortening. Due to formation of the intermolecular compounds, it can prevent from hardening day by day and, therefore, has an advantage of no need to frequently administer methods of crystal precipitation and preservation methods.

Next, Examples will further illustrate the present invention.

EXAMPLES

Production Example 1

Preparation of Powder Lipase

Low molecular components were removed with UF module (SIP-0013 produced by Asahi Kasei Corporation) from the liquid lipase derived from *Rhizomucor miehei* produced by Novozymes Japan Limited (trade name: Palatase20000L), wherein lipase is dissolved and dispersed in an aqueous solution, to obtain a lipase containing aqueous solution 1 (the solid concentration 20.1 weight %). More concretely, UF filtration was conducted to the liquid lipase (Palatase20000L) under cooling with ice to concentrate it to ½ volume, and the same amount of 0.01M phosphoric acid buffer of pH7 as that of the concentration solution was added thereto. The same operations of UF filtration and addition of phosphoric acid buffer were conducted twice to the obtained solution. Then, UF filtration was further conducted to the solution and thus obtained lipase concentrated solution was regarded as a lipase containing aqueous solution 1.

20 mL of milk (Koiwai Milk Oishisa-shitate produced by Koiwai Dairy Products Co., Ltd.: the solid concentration 12.9 weight %) was added to 20 mL of the lipase containing aqueous solution 1. The pH of thus obtained solution was adjusted to pH6.8 to 6.9 with an aqueous solution of sodium hydroxide.

The volume ratio of the lipase concentrated solution (=the lipase containing aqueous solution 1): milk was 1:1 and the solid content of milk was 0.64-fold to that of the lipase containing aqueous solution 1.

The solution was spray-dried with a spray-dryer (SD-1000 produced by Tokyo Rikakikai Co., Ltd.) in the conditions of inlet temperature of 130° C., drying air quantity of 0.7 to 1.1 m³/min. and spray-drying pressure of 11 to 12 kpa to obtain lipase powder. The form of the lipase powder particles was spherical, 90 weight % or more of the lipase powder was within the particle diameters of 1 to 100 μm, and the average particle diameter was 7.6 μm. The particle diameter was measured by a particle size distribution analyzer (LA-500) of HORIBA, Ltd.

Meanwhile, the solid concentration in the lipase containing aqueous solution and that of milk were measured in accordance with the following method. The concentrations were measured as Brix. % with a sugar content analyzer (BRX-242 produced by C.I.S. Corporation).

Production Example 2

Production of MLCT A (8S8)

5 g of Lipase QLM (Meito Sangyo Co., Ltd.) were added to 700 g of high-oleic sunflower oil (trade name: Olein-Rich, produced by Showa Sangyo Co., Ltd.) and 300 g of tricaprylin (trade name: Tricaprylin, produced by Sigma Aldrich Japan) in 2000 ml, reaction flask. Then, the reaction was conducted to the mixture stirring with propellers at 50° C. for 2 hours. The surviving enzymes were removed by filtration to obtain 980 g of the reaction substance.

4900 g of octanoic acid ethylester (trade name: Octanoic Acid Ethyl, produced by Inoue Perfumery Co., Ltd.) and 120 g of enzyme powder prepared by Production Example 1 were added to 980 g of the reaction substance in 10 L reaction flask. Then, the enzyme reaction was conducted to the mixture stirring with propellers at 40° C. for 26 hours to obtain 5600 g of the reaction substance. After the reaction, each octanoic acid ethylester, oleic acid ethylester and tricaprylin was taken out from the reaction substance with a centrifugal molecular distillation equipment (produced by NIPPON SHARYO, LTD.) to obtain 300 g of a triglyceride containing substance.

300 g of the triglyceride containing substance was put into a tank for the pressure proof reaction, 900 mg of Ni catalyst was added thereto, and hydrogen pressure was set to 0.3 MPa. Then the substance was heated up to 180° C. and stirred for 5 hours. After the super-hydrogenation, the catalyst was removed to obtain 300 g of triacylglycerides consisting of medium-chain and long-chain fatty acids (MLCT) A (8S8).

Production Example 3

Production of MLCT B (10S10)

5 g of 1,3-didecanoyl-2-linoleyl glycerin (produced by Osaka Synthetic Chemical Laboratories, Inc.) was dissolved in 100 mL of ethanol. 2.5 g of 10% palladium carbon (Wako Pure Chemical Industries, Ltd.) was added thereto and reacted under hydrogen atmosphere at 40° C. for 3 hours. After filtering out the palladium carbon, ethanol was removed to 3.5 g of MLCT B.

Production Example 4

Production of MLCT C (88S)

230 g of oleic acid (trade name: EXTRA OS-85, produced by NOF Corporation) and 69 g of enzyme powder prepared by Production Example 1 were added to 2070 g of tricaprylin (trade name: Tricaprylin, produced by Sigma Aldrich Japan) in 5000 mL reaction flask. Then, the enzyme reaction was conducted to the mixture stirring with propellers at 40° C. for 13 hours. The surviving enzymes were removed by filtration to obtain 2250 g of the reaction substance. After the reaction, each octanoic acid, oleic acid and tricaprylin was taken out from the reaction substance with a centrifugal molecular distillation equipment (produced by NIPPON SHARYO, LTD.) to obtain 270 g of a triglyceride containing substance.

270 g of the triglyceride containing substance was put into a tank for the pressure proof reaction, 810 mg of Ni catalyst was added thereto, and hydrogen pressure was set to 0.3 MPa. Then the substance was heated up to 180° C. and stirred for 5 hours. After the super-hydrogenation, the catalyst was removed to obtain 270 g of MLCT C (88S).

Production Example 5

Production of MLCT D (88S/8S8 Mixture)

5 g of Lipase QLM (Meito Sangyo Co., Ltd.) were added to 400 g of high-oleic sunflower oil (trade name: Olein-Rich, produced by Showa Sangyo Co., Ltd.) and 600 g of tricaprylin (trade name: Tricaprylin, produced by Sigma Aldrich Japan) in 2000 mL reaction flask. Then, the reaction was conducted to the mixture stirring with propellers at 40° C. for 2 hours. The surviving enzymes were removed by filtration to obtain 980 g of the reaction substance.

After the reaction, 400 g of the distilled component was obtained from the reaction oil with a centrifugal molecular distillation equipment (produced by NIPPON SHARYO, LTD.) in the conditions of 240° C. and 1 Pa.

400 g of thus obtained triglyceride containing substance was put into a tank for the pressure proof reaction, 1200 mg of Ni catalyst was added thereto, and hydrogen pressure was set to 0.3 MPa. Then the substance was heated up to 180° C. and stirred for 5 hours. After the super-hydrogenation, the catalyst was removed to obtain 400 g of MLCT D (88S/8S8 mixture).

Tables 1 and 2 show the results of GLC analysis of triglyceride compositions of MLCT obtained in Production Examples 2 to 5. Meanwhile, the positional isomer ratio: (88S+S88)/8S8 was determined based on the assumption that the positional isomer ratio is not changed by hydrotreating from the analysis of the distilled component before the hydrotreating or HPLC (by Ag ion column) of the triglyceride containing substance. The ratio of the MLCT B having decanoic acid as the main component was determined in the same way.

TABLE 1

| Composition (weight %) | 888 | 88P + P88 + 8P8 | 88S + S88 | 8S8 | 8SS + SS8 + S8S |
|---|---|---|---|---|---|
| MLCT A | 0 | 0.2 | 3.6 | 95.3 | 0.9 |
| MLCT C | 6.0 | 2.9 | 85.3 | 2.2 | 3.6 |
| MLCT D | 0.8 | 3.8 | 60.2 | 32.4 | 2.8 |

TABLE 2

| Composition (weight) | 1010S + S1010 | 10S10 | Others |
|---|---|---|---|
| MLCT B | 2.9 | 95.2 | 1.8 |

In tables, 888 indicates that all of the first, second and third positions of glycerin are esters of octanoic acids; 88P indicates that the sn-1 and sn-2 positions of glycerin are esters of octanoic acids, and the sn-3 position thereof is an ester of palmitic acid; and 10S10 indicates that the sn-1 and sn-3 positions of glycerin are esters of decanoic acids, and the sn-2 position thereof is an ester of stearic acid.

Example 1

Preparation of Intermolecular Compound I of MLCT A (8S8) and Cocoa Butter

MLCT A (8S8) and cocoa butter (trade name: D Cocoa Butter, produced by Daito Cacao Co., Ltd.) were mixed in the weight ratio of 39.5:60.5, kept at 50° C. for 30 minutes, and kept at 33° C. for 30 minutes. Then, the mixture was kept at 5° C. for 2 hours, and tempering was conducted thereto to obtain an intermolecular compound I-T having the long spacing value of 75 Å. Similarly, MLCT A and cocoa butter were mixed in the weight ratio of 39.5:60.5, kept at 50° C. for 30 minutes and kept at 5° C. for 2 hours to obtain an intermolecular compound I-N having the long spacing value of 75 Å.

MLCT A, cocoa butter and acetone were mixed in the weight ratio of 39.5:60.5:500, superheated up to 50° C. to prepare the acetone solution. Then, the solution was cooled with ice, and the precipitated crystals were filtered out and dried to obtain an intermolecular compound I-S having the long spacing value of 75 Å.

Example 2

Preparation of Intermolecular Compound II of MLCT B (10S10) and Cocoa Butter

MLCT B (10S10) and cocoa butter (trade name: D Cocoa Butter, produced by Daito Cacao Co., Ltd.) were mixed in the weight ratio of 41.2:58.8, kept at 50° C. for 30 minutes and kept at 5° C. for 2 hours to obtain an intermolecular compound II having the long spacing value of 77 Å.

Example 3

Preparation of Intermolecular Compound III of MLCT C (88S) and Cocoa Butter

MLCT C (88S) and cocoa butter (trade name: D Cocoa Butter, produced by Daito Cacao Co., Ltd.) were mixed in the weight ratio of 42.6:57.4, kept at 50° C. for 30 minutes and cooled down at 5° C. for 2 hours to obtain an intermolecular compound III having the long spacing value of 75 Å.

Example 4

Preparation of Intermolecular Compound IV of MLCT D (88S/8S8 Mixture) and Cocoa Butter MLCT D (88S/8S8 mixture) and cocoa butter (trade name: D Cocoa Butter, produced by Daito Cacao Co., Ltd.) were mixed in the weight ratio of 41.0:59.0, kept at 50° C. for 30 minutes and kept at 5° C. for 2 hours to obtain an intermolecular compound IV having the long spacing value of 75 Å.

Table 3 shows the results of GLC analysis of triglyceride compositions (weight %) of used cocoa butter (trade name: D Cocoa Butter, produced by Daito Cacao Co., Ltd.)

TABLE 3

| Compositions (weight %) | POP | POS | SOS | Others |
|---|---|---|---|---|
| Cocoa butter | 16.7 | 38.5 | 26.0 | 18.8 |

In the intermolecular compounds I-T, I-N, I-S and II to IV prepared in Examples 1 to 4, formation of the intermolecular compounds was confirmed by X-ray diffraction. The measurement conditions are as follows.

Measuring equipment: RINT 2100 Ultima+ produced by Rigaku Corporation

X-ray: Cu K-α 140 kV/40 mA λ=1.5405

Goniometer: Ultima+Horizontal Goniometer Type I

FIGS. 1 to 6 show X-ray diffraction results (charts) of the intermolecular compounds I-T, I-N, I-S and II to IV prepared in Examples 1 to 4, and Tables 4 to 9 show the measurement data thereof

TABLE 4

| (Intermolecular Compound I-T) | | |
|---|---|---|
| 2θ (°) | Value d (Å) | Strength (cps) |
| 2.38 | 37.089 | 371 |
| 3.52 | 25.080 | 33 |
| 5.84 | 15.120 | 59 |
| 6.98 | 12.653 | 1 |
| 7.76 | 11.383 | 2 |
| 8.18 | 10.799 | 2 |
| 10.52 | 8.402 | 4 |
| 12.90 | 6.856 | 2 |
| 16.46 | 5.381 | 10 |
| 16.86 | 5.254 | 5 |
| 19.30 | 4.595 | 55 |
| 20.96 | 4.234 | 2 |
| 22.34 | 3.976 | 6 |
| 22.90 | 3.880 | 9 |
| 23.90 | 3.720 | 16 |
| 24.84 | 3.581 | 3 |
| 26.88 | 3.314 | 2 |
| 27.12 | 3.285 | 2 |
| 28.08 | 3.175 | 1 |
| 29.74 | 3.001 | 1 |

It could be observed that the peak corresponding to the (002) reflections of the long spacing value 75 Å was 2θ=2.380°, the peak corresponding to the (003) reflections was 2θ=3.520°, the peak corresponding to the (005) reflections was 2θ=5.840°, and the peak corresponding to the (006) reflections was 2θ=6.980°.

TABLE 5

| (Intermolecular Compound I-N) | | |
|---|---|---|
| 2θ (°) | Value d | Strength (cps) |
| 2.50 | 35.309 | 196 |
| 3.64 | 24.253 | 32 |
| 5.92 | 14.916 | 70 |
| 7.06 | 12.510 | 2 |
| 8.34 | 10.593 | 1 |
| 10.580 | 8.3547 | 6 |
| 13.00 | 6.804 | 3 |
| 16.54 | 5.355 | 7 |
| 17.62 | 5.029 | 15 |
| 19.40 | 4.571 | 259 |
| 20.86 | 4.254 | 20 |
| 21.22 | 4.183 | 1 |
| 21.90 | 4.055 | 3 |
| 22.24 | 3.993 | 5 |
| 22.92 | 3.876 | 66 |
| 23.06 | 3.853 | 6 |
| 24.06 | 3.695 | 120 |
| 24.96 | 3.564 | 3 |
| 27.00 | 3.299 | 2 |
| 28.02 | 3.181 | 1 |

It could be observed that the peak corresponding to the (002) reflections of the long spacing value 74 Å was 2θ=2.500°, the peak corresponding to the (003) reflections was 2θ=3.640°, the peak corresponding to the s (005) reflections was 2θ=5.920°, the peak corresponding to the (006) reflections was 2θ=7.060°, the peak corresponding to the (007) reflections was 2θ=8.340° and the peak corresponding to the (009) reflections was 2θ=10.580°.

TABLE 6

| (Intermolecular Compound I-S) | | |
|---|---|---|
| 2θ (°) | Value d (Å) | Strength (cps) |
| 2.26 | 39.059 | 196 |
| 3.42 | 25.813 | 14 |
| 5.72 | 15.437 | 26 |
| 10.54 | 8.386 | 1 |
| 16.42 | 5.394 | 12 |
| 16.76 | 5.285 | 5 |
| 17.98 | 4.929 | 2 |
| 19.26 | 4.604 | 63 |
| 19.92 | 4.453 | 3 |
| 22.18 | 4.004 | 4 |
| 22.54 | 3.941 | 5 |
| 22.76 | 3.903 | 74 |
| 23.32 | 3.811 | 5 |
| 23.76 | 3.741 | 12 |

It could observed that the peak corresponding to the (002) reflections of the long spacing value 77 Å was 2θ=2.260°, the peak corresponding to the (003) reflections was 2θ=3.420°, and the peak corresponding to the (005) reflections was 2θ=5.720°.

When comparing the intermolecular compound I-T with the intermolecular compounds I-N and I-S, their charts are similar while their values of d vary and, therefore, it is thought that they are the same.

TABLE 7

(Intermolecular Compound II)

| 2θ (°) | Value d | Strength (cps) |
|---|---|---|
| 2.30 | 38.379 | 47 |
| 3.44 | 25.663 | 4 |
| 5.66 | 15.601 | 7 |
| 6.70 | 13.181 | 4 |
| 7.78 | 11.354 | 1 |
| 8.24 | 10.721 | 1 |
| 10.14 | 8.716 | 1 |
| 12.34 | 7.166 | 2 |
| 16.56 | 5.381 | 13 |
| 16.86 | 5.254 | 130 |
| 17.42 | 5.086 | 2 |
| 18.20 | 4.220 | 2 |
| 19.32 | 4.590 | 824 |
| 19.96 | 4.444 | 5 |
| 20.66 | 4.295 | 1 |
| 22.24 | 3.993 | 12 |
| 23.22 | 3.827 | 17 |
| 23.98 | 3.707 | 33 |
| 24.72 | 3.598 | 3 |
| 24.98 | 3.561 | 5 |
| 27.22 | 3.273 | 1 |

It could be observed that the peak corresponding to the (002) reflections of the long spacing value 77 Å was 2θ=2.300°, the peak corresponding to the (003) reflections was 2θ=3.440°, the peak corresponding to the (005) reflections was 2θ=5.660°, and the peak corresponding to the (006) reflections was 2θ=6.700°.

TABLE 8

(Intermolecular Compound III)

| 2θ (°) | Value d (Å) | Strength (cps) |
|---|---|---|
| 2.340 | 37.7239 | 1262 |
| 3.500 | 25.2233 | 96 |
| 3.960 | 22.2943 | 38 |
| 5.740 | 15.3841 | 188 |
| 10.160 | 8.6992 | 19 |
| 10.420 | 8.4827 | 21 |
| 14.520 | 6.0953 | 16 |
| 15.260 | 5.8014 | 15 |
| 16.920 | 5.2358 | 33 |
| 17.280 | 5.1275 | 26 |
| 17.820 | 4.9733 | 23 |
| 20.460 | 4.3372 | 278 |
| 21.600 | 4.1108 | 132 |
| 23.020 | 3.8603 | 35 |
| 23.680 | 3.7542 | 289 |
| 25.740 | 3.4582 | 36 |
| 26.560 | 3.3533 | 21 |
| 28.120 | 3.1707 | 17 |

It could be observed that the peak corresponding to the (002) reflections of the long spacing value 75 Å was 2θ=2.340°, the peak corresponding to the (003) reflections was 2θ=3.500°, and the peak corresponding to the (005) reflections was 2θ=5.740°.

TABLE 9

(Intermolecular Compound IV)

| 2θ (°) | Value d (V) | Strength (cps) |
|---|---|---|
| 2.380 | 37.0899 | 1401 |
| 3.580 | 24.6598 | 67 |
| 5.840 | 15.1209 | 150 |

TABLE 9-continued (Intermolecular Compound IV)

| 2θ (°) | Value d (V) | Strength (cps) |
|---|---|---|
| 10.540 | 8.3864 | 25 |
| 16.520 | 5.3616 | 51 |
| 19.440 | 4.5624 | 211 |
| 20.420 | 4.3456 | 141 |
| 20.600 | 4.3080 | 160 |
| 21.360 | 4.1564 | 21 |
| 21.640 | 4.1033 | 31 |
| 22.980 | 3.8669 | 36 |
| 23.680 | 3.7542 | 179 |
| 25.040 | 3.5533 | 18 |
| 25.760 | 3.4556 | 30 |

It could be observed that the peak corresponding to the (002) reflections of the long spacing value 75 Å was 2θ=2.380°, the peak corresponding to the (003) reflections was 2θ=3.580°, and the peak corresponding to the (005) reflections was 2θ=5.840°.

Table 10 shows the long spacing values of two fats and oils forming the intermolecular compounds, that is, cocoa butter and MLCT. The peaks indicating the long spacing values of both fats and oils were not seen in the analysis of X-ray diffraction of the above intermolecular compounds and, therefore, formation of the intermolecular compounds is shown.

TABLE 10

Cocoa butter and MLCT

| Fats and oils | | Long spacing value (Å) | Chain length structure |
|---|---|---|---|
| Cocoa butter | IV | 45 | 2 CL |
| | V | 63 | 3 CL |
| MLCT A | | 46 | 3 CL |
| MLCT B | | 45 | 3 CL |
| MLCT C | | 48 | 3 CL |

Example 5

Production of Chocolates Containing the Intermolecular Compounds of the Present Invention Chocolates were produced in accordance with blending in Table 11. Tempering was conducted to the control and the present invention product 1-T, and then they were poured into the mold and cooled down at 5° C. for 30 minutes. Regarding the present invention product 1-N, the temperature of chocolate product was kept at 40° C., then cooled down at 5° C. for 30 minutes without tempering, and unmolded. The obtained chocolates were preserved at 20° C. for one week, and snapping ability, gloss and dissolution ability in the mouth were evaluated.

TABLE 11

Blending of chocolates (weight %)

| | Control | The present inv. product 1-T | The present inv. product 1-N |
|---|---|---|---|
| Powder sugar | 50.6 | 50.6 | 50.6 |
| Cacao mass | 36.0 | 36.0 | 36.0 |
| *(cocoa butter) | (19.8) | (19.8) | (19.8) |

TABLE 11-continued

| | Blending of chocolates (weight %) | | |
|---|---|---|---|
| | Control | The present inv. product 1-T | The present inv. product 1-N |
| Cocoa butter | 12.9 | | |
| MLCT A | | 12.9 | 12.9 |
| Lecithin | 0.5 | 0.5 | 0.5 |

(Chocolate evaluation results)

The detachability from the chocolate mold, snapping ability, gloss and dissolution ability in the mouth were evaluated on the chocolates produced by the above method. Table 12 shows the evaluation results. The present invention product 1 showed good results compared with the control regardless of with or without tempering.

TABLE 12

| | Evaluation results of chocolate bar | | |
|---|---|---|---|
| | Control | The present invention product 1-T | The present invention product 1-N |
| Demolding ability | ◉ | ○ | ○ |
| snapping ability | ○ | ○ | ○ |
| gloss | ◉ | ◉ | ◉ |
| Melting behavior | ○ | ○ | ○ |

Criteria
Demolding ability ◉: demolded without hitting
○: demolded when hitting
X: not demolded
Snapping ability ○: easily snapped
Δ: not easily snapped
X: not snapped (just bending)
Gloss ◉: extremely good
(check with eyes) ○: good but partially dull
X: no gloss
Melting behavior ○: good
in the mouth X: bad Example 6

Production of Soft Chocolates Containing the Intermolecular Compounds of the Present Invention Various fats and oils were added in accordance with blending in Table 13 to Couverture Selectionne Noir (produced by Daito Cacao Co., Ltd.; oil content 40%) to produce chocolates. The temperature of the chocolates was kept at 40° C., put in the petri dish having the diameter of 5 cm, and cooled down at 5° C. for 5 minutes. Then, the chocolates were preserved at 20° C. and the fat-bloom stability, gloss and dissolution ability in the mouth were evaluated.

TABLE 13

| | Blending of soft chocolates (weight %) | | |
|---|---|---|---|
| | Control | The present invention product 2 | The present invention product 3 |
| Couverture chocolate | 50 | 50 | 50 |
| Lauric hard butter | 15 | | |
| MLCT C | | 15 | |
| MLCT D | | | 15 |

(Soft chocolate evaluation results)

The fat-bloom stability, gloss and dissolution ability in the mouth were evaluated on the chocolates produced by the above method. Table 14 shows the evaluation results. The present invention products 2 and 3 showed the good fat-bloom stability compared with the control. Both the gloss and dissolution ability in the mouth thereof were good and the taste was also good because large amounts of cocoa butter or cacao mass were used.

TABLE 14

| | Evaluation results of coating chocolates | | |
|---|---|---|---|
| | Control | The present invention product 2 | The present invention product 3 |
| Fat-bloom stability (20° C.) | 2(+) 4(++) | 30(−) | 30(−) |
| Gloss | ○ | ○ | ○ |
| Melting behavior | ○ | ○ | ○ |

Criteria
The fat-bloom stability test numbers: days
(+): partially blooming
(++): overall blooming The present invention products 1-N, 2 and 3 prepared as chocolates were finely whittled with a knife at 20° C. 3 g of the powder was put on the filter paper and rinsed with 150 g of 5° C. ice water. After drying the residue in the desiccator, it was filled in the sample board, and X-ray diffraction measurement was conducted thereto. Though the peak position somewhat varied because of weak peak strengths in whole due to the effect of non fat chocolate solids, it was confirmed that the prepared present invention products 1 to 3 formed the intermolecular compounds of the present invention.

Figure 7:
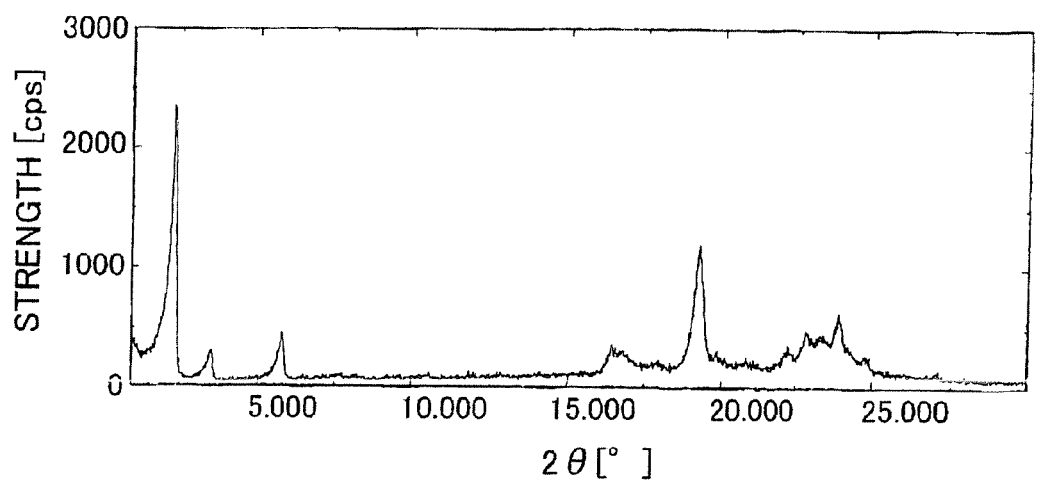
FIG. 7 shows the X-ray diffraction chart of the present invention product 1 of the present invention.
Figure 8:
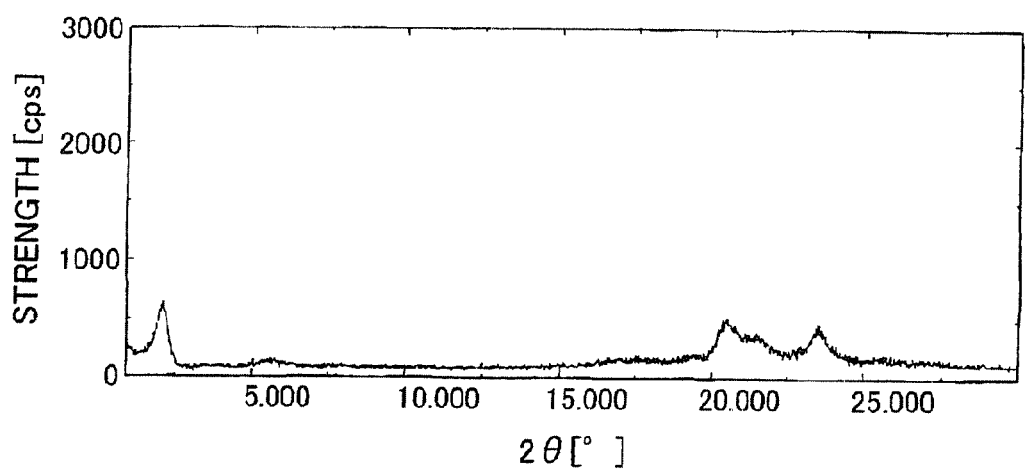
FIG. 8 shows the X-ray diffraction chart of the present invention product 2 of the present invention.
Figure 9:
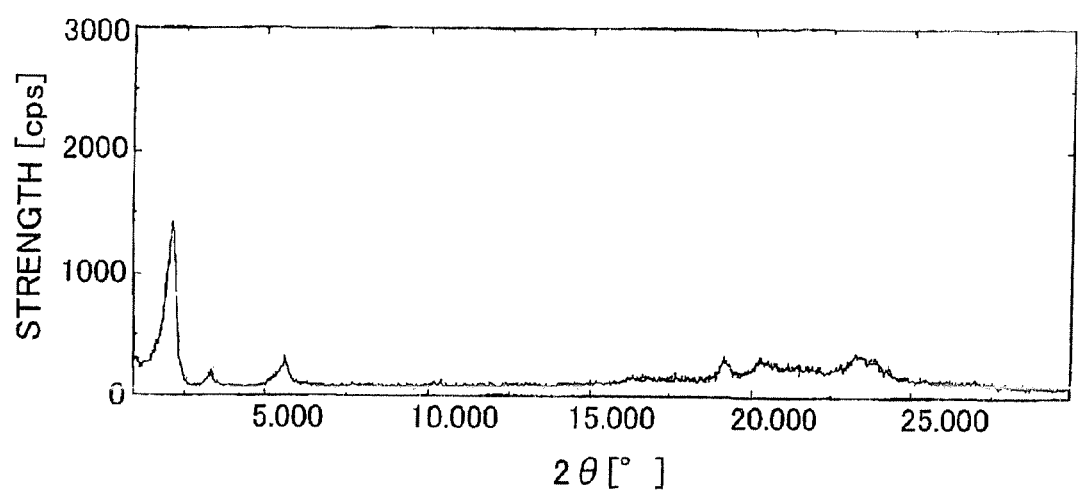
FIG. 9 shows the X-ray diffraction chart of the present invention product 3 of the present invention.

FIGS. 7 to 9 show the measurement results (charts), and Tables 15 to 17 show the measurement data thereof.

TABLE 15

| (The present invention product 1-N) | | |
|---|---|---|
| $2\theta$ (°) | Value d (Å) | Strength (cps) |
| 2.260 | 39.0590 | 1160 |
| 3.440 | 25.6631 | 142 |
| 5.780 | 15.2777 | 226 |
| 7.660 | 11.5318 | 16 |
| 10.500 | 8.4182 | 24 |
| 14.100 | 6.2759 | 16 |
| 15.580 | 5.6829 | 18 |
| 16.400 | 5.4006 | 119 |
| 16.760 | 5.2854 | 67 |
| 17.920 | 4.9458 | 32 |
| 19.240 | 4.6093 | 560 |
| 19.820 | 4.4757 | 41 |
| 22.200 | 4.0010 | 59 |
| 22.820 | 3.8937 | 116 |
| 23.320 | 3.8113 | 64 |
| 23.880 | 3.7232 | 188 |
| 24.780 | 3.5900 | 47 |
| 25.980 | 3.4268 | 18 |
| 27.040 | 3.2948 | 24 |
| 27.940 | 3.1907 | 22 |

It could be observed that the peak corresponding to the (002) reflections of the long spacing value 75 Å was $2\theta=2.260°$, the peak corresponding to the (003) reflections was $2\theta=3.440°$, and the peak corresponding to the (005) reflections was $2\theta=5.780°$.

TABLE 16

(The present invention product 2)

| 2θ (°) | Value d (Å) | Strength (cps) |
|---|---|---|
| 2.120 | 41.6381 | 227 |
| 5.540 | 15.9390 | 21 |
| 7.920 | 11.1538 | 18 |
| 15.680 | 5.6469 | 18 |
| 16.260 | 5.4468 | 18 |
| 16.960 | 5.2235 | 20 |
| 20.460 | 4.3372 | 123 |
| 20.760 | 4.2752 | 60 |
| 21.480 | 4.1335 | 43 |
| 23.540 | 3.7762 | 102 |
| 25.380 | 3.5064 | 25 |
| 26.260 | 3.3909 | 23 |
| 26.560 | 3.3533 | 28 |
| 28.860 | 3.0911 | 26 |

It could be observed that the peak corresponding to the (002) reflections of the long spacing value 75 Å was 2θ=2.120°, and the peak corresponding to the (005) reflections was 2θ=5.540°.

TABLE 17

(The present invention 3)

| 2θ (°) | Value d (Å) | Strength (cps) |
|---|---|---|
| 2.140 | 41.2490 | 635 |
| 3.300 | 26.7515 | 62 |
| 5.620 | 15.7123 | 110 |
| 7.700 | 11.4720 | 17 |
| 15.220 | 5.8165 | 17 |
| 16.300 | 5.4335 | 28 |
| 16.800 | 5.2729 | 24 |
| 18.020 | 4.9186 | 15 |
| 19.160 | 4.6284 | 95 |
| 20.220 | 4.3881 | 49 |
| 20.500 | 4.3288 | 42 |
| 21.120 | 4.2031 | 30 |
| 21.420 | 4.1449 | 29 |
| 22.720 | 3.9106 | 21 |
| 23.200 | 3.8308 | 69 |
| 23.860 | 3.7263 | 57 |
| 24.280 | 3.6628 | 20 |
| 24.840 | 3.5814 | 20 |
| 27.520 | 3.2384 | 18 |
| 28.860 | 3.0911 | 16 |

It could be observed that the peak corresponding to the (002) reflections of the long spacing value 75 Å was 2θ=2.140°, the peak corresponding to the (003) reflections was 2θ=3.300°, and the peak corresponding to the (005) reflections was 2θ=5.620°.

What is claimed is:

1. An intermolecular compound consisting essentially of:
   (a) di-saturated medium chain fatty acids mono-saturated long chain fatty acid triglyceride; and
   (b) 1,3-di saturated long chain fatty acids 2-mono-unsaturated long chain fatty acid triglyceride,
   wherein the intermolecular compound has a long spacing value by X-ray diffraction of 65 Å or more.

2. The intermolecular compound according to claim 1, wherein both of the medium chain fatty acids have 6 to 12 carbon atoms and all of the long chain fatty acids have 14 to 24 carbon atoms.

3. The intermolecular compound according to claim 1, wherein both of the medium chain fatty acids have 6 to 12 carbon atoms and all of the long chain fatty acids have 14 to 24 carbon atoms.

4. The intermolecular compound according to claim 1, wherein both of the medium chain fatty acids have 8 to 10 carbon atoms and all of the long chain fatty acids have 16 to 18 carbon atoms.

5. The intermolecular compound according to claim 1, wherein (a) di-saturated medium chain fatty acids mono-saturated long chain fatty acid triglyceride is 1,3-di-saturated medium chain fatty acids 2-mono-saturated long chain fatty acid triglyceride.

6. The intermolecular compound according to claim 1, wherein (b) 1,3-di saturated long chain fatty acids 2 mono unsaturated long chain fatty acid trigyceride is selected from the group consisting of:
   1,3-dipalmitoyl-2-oleoyl glycerin,
   1,3-distearoyl-2-oleoyl glycerin,
   2-oleoyl palmitoyl stearoyl glycerin, and
   combinations thereof.

7. The intermolecular compound according to claim 1, wherein (b) 1,3-di-saturated long chain fatty acids 2-mono-unsaturated long chain fatty acid triglyceride is derived from cocoa butter.

8. The intermolecular compound according to claim 1, wherein the long spacing value by X-ray diffraction is 70 Å or more.

9. The intermolecular compound according to claim 1, wherein the long spacing value by X-ray diffraction is 70 to 85 Å.

10. A food containing the intermolecular compound according to claim 1.

11. The food according to claim 10, wherein the food is selected from the group consisting of chocolate, margarine, and shortening.

* * * * *